United States Patent
Fan et al.

(10) Patent No.: US 6,956,958 B2
(45) Date of Patent: Oct. 18, 2005

(54) METHOD OF EMBEDDING COLOR INFORMATION IN PRINTED DOCUMENTS USING WATERMARKING

(75) Inventors: Zhigang Fan, Webster, NY (US); Shen-ge Wang, Fairport, NY (US); Hui Cheng, Bridgewater, NJ (US)

(73) Assignee: Xerox Corporation, Stamford, CT (US)

( * ) Notice: Subject to any disclaimer, the term of this patent is extended or adjusted under 35 U.S.C. 154(b) by 639 days.

(21) Appl. No.: 10/082,535

(22) Filed: Feb. 21, 2002

(65) Prior Publication Data

US 2003/0156753 A1    Aug. 21, 2003

(51) Int. Cl.[7] .............................................. G06K 9/00
(52) U.S. Cl. ...................................... 382/100; 382/167
(58) Field of Search ................................ 382/100, 162, 382/166, 167, 218, 232, 233, 253, 300; 358/3.23, 358/405, 3.28, 447, 452, 501, 505, 518, 527; 380/51, 54, 55, 202; 713/176; 348/463; 725/20; 370/527, 529

(56) References Cited

U.S. PATENT DOCUMENTS

| | | | |
|---|---|---|---|
| 5,734,752 A | 3/1998 | Knox | 382/212 |
| 5,790,703 A | 8/1998 | Wang | 382/212 |
| 5,946,103 A | 8/1999 | Curry | 358/405 |
| 5,949,055 A * | 9/1999 | Fleet et al. | 235/469 |
| 6,268,866 B1 * | 7/2001 | Shibata | 358/3.28 |
| 6,304,345 B1 * | 10/2001 | Patton et al. | 358/527 |
| 6,332,194 B1 * | 12/2001 | Bloom et al. | 713/176 |
| 6,439,465 B1 * | 8/2002 | Bloomberg | 235/494 |
| 6,572,025 B1 * | 6/2003 | Nishikado et al. | 235/494 |
| 6,731,775 B1 * | 5/2004 | Ancin | 382/100 |
| 6,744,448 B1 * | 6/2004 | Bernard et al. | 715/764 |
| 6,813,710 B1 * | 11/2004 | Wu et al. | 713/176 |
| 6,823,075 B2 * | 11/2004 | Perry | 382/100 |
| 2001/0026616 A1 * | 10/2001 | Tanaka | 380/202 |

* cited by examiner

Primary Examiner—Andrew W. Johns
Assistant Examiner—Amir Alavi
(74) Attorney, Agent, or Firm—Jeannette M Walder

(57) ABSTRACT

A method for enhancing color fidelity in multi-reproduction, includes scanning an image to be reproduced, wherein the image contains an invisible digital watermark including color information; decoding the color information contained in the watermark; comparing the decoded color information with the scanned image; generating a correction table from the differences between the decoded color information and the scanned image; and performing color correction on the scanned image using the correction table. This method confines the color error to one generation, even when copies go through multiple reproduction.

6 Claims, 5 Drawing Sheets

METHOD OF EMBEDDING COLOR INFORMATION IN PRINTED DOCUMENTS USING WATERMARKING

FIELD OF THE INVENTION

This invention relates generally to systems and methods for enhancing color fidelity in color reproduction, and in particular to a system and method for enhancing color fidelity in multi-generation reproduction.

BACKGROUND OF THE INVENTION

In most existing color and black and white reproduction systems, color and gray scale correction is performed in an open-looped fashion. For multiple generation color copying, color fidelity cannot be guaranteed since the errors introduced in color correction may accumulate with each subsequent copy of a copy. It would be desirable to enhance color fidelity in printed documents and to guarantee the same color correction from print to print or copy to copy.

SUMMARY OF THE INVENTION

To enhance color fidelity in multi-generation reproduction, color information is embedded as invisible digital watermarks in hard copies. Color information is extracted from an original image, which may be an original hard copy image or an original digital image or the "best" copy of a hard copy image. For purposes of the following discussion, it should be noted that color information is not limited to "color" and may also include gray scale information for black and white images. The extracted color information may then be compressed (optionally) before being embedded and encoded in a digital watermark associated with the original image. Any suitable watermarking algorithm may be used to embed and encode the color information.

A hard copy of the original image containing an invisible digital watermark with the color information may then be produced. When the hard copy is scanned, the embedded information can be retrieved to provide guidelines for color correction. The method of the invention may significantly enhance color fidelity. Furthermore, it will confine the color error to one generation, even when copies go through multiple generation reproduction. Thus, fidelity of both color and black and white hard copies will be improved in multi-generation reproduction. Another feature of the method of the invention is that a black and white hard copy of an original color image, which contains the digital watermark with color information, can be used to create a color copy of the original color image. Thus color copies can be made with only a black and white hard copy of the original color image.

A method for enhancing color fidelity in multi-reproduction, according to the invention, includes scanning an image to be reproduced, wherein the image contains an invisible digital watermark including color information, decoding the color information contained in the watermark, comparing the decoded color information with the scanned image, generating a correction table from the differences between the decoded color information and the scanned image, and performing color correction on the scanned image using the correction table. If the correction table contains empty values, the correction table can be completed using interpolation and extrapolation.

Various methods of extracting color information from the original document can be used. For example, the color information may include color information from sub-sampled regions of the original image. Color information may also be extracted by smoothing and sampling the original image, sorting the samples into smooth samples and edge samples, quantizing pixel values of the smooth samples, and compressing the quantized pixel values of the smooth samples. The edge samples may be represented by a special value and may also be treated together with the color information. Additionally, registration information may be included in the digital watermark if the watermarking algorithm does not provide for registration information.

DETAILED DESCRIPTION OF EXEMPLARY EMBODIMENTS

Architecturally, a method of enhancing color fidelity in multi-reproduction includes an encoding part, which usually resides in a printer (or the printing part of a copier, but may also be resident in software stored in a computer) and a decoding part which usually resides in a scanner (or the scanning part of a copier, but may also be resident in software stored in a computer). Each part can be divided into a top layer and a bottom layer. The top layers are responsible for management of color information while the bottom layers are responsible for embedding/detection of digital watermarks containing the color information. Specifically, the encoding part extracts the color and other information from the image to be printed at the top layer and embeds the signal as digital watermarks at the bottom layer. The decoding part retrieves the information from the watermarks in the scanned images at the bottom layer and uses the information to perform color correction at the top layer.

Figure 1:
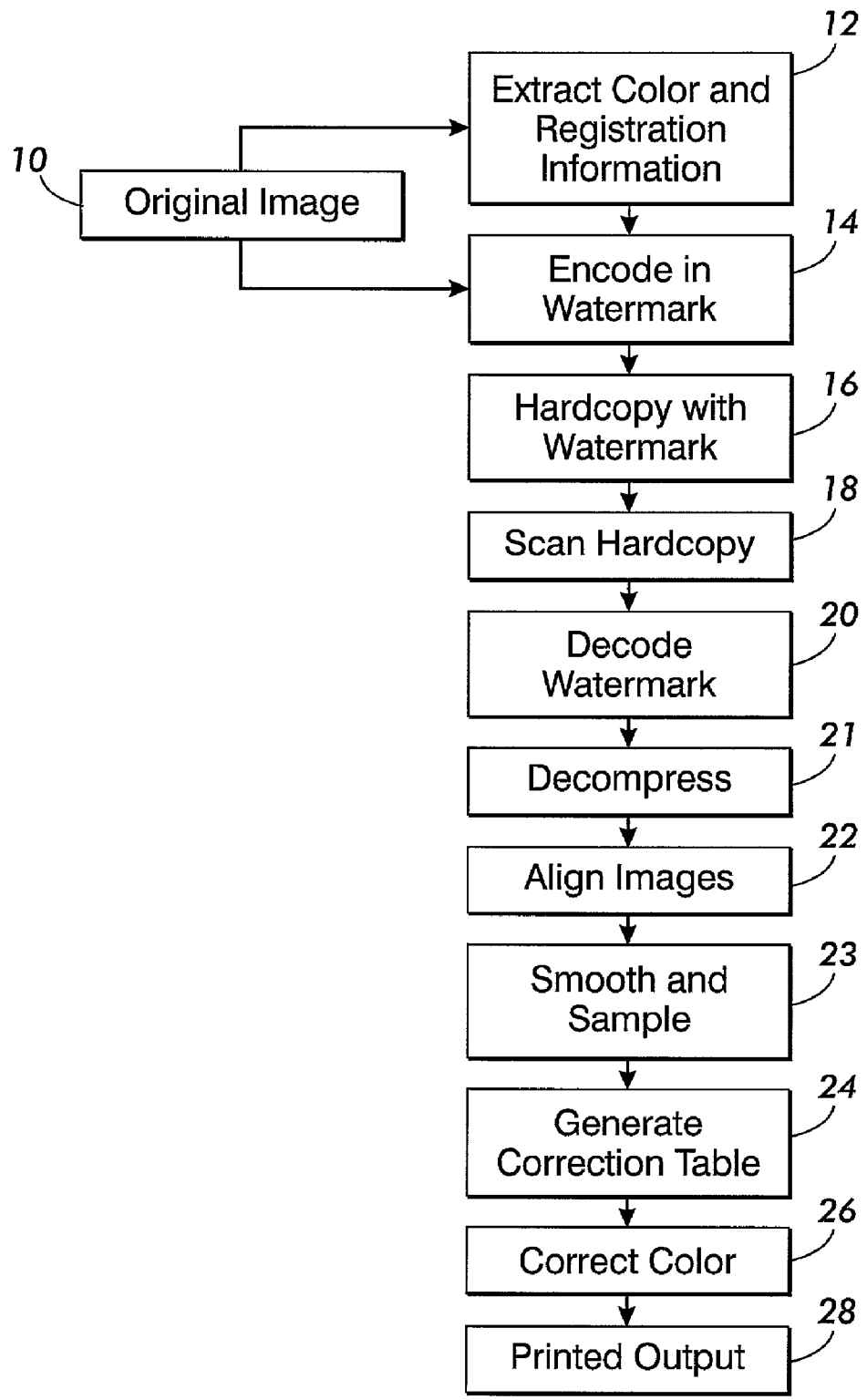
FIG. 1 is a block diagram of a method for enhancing color fidelity in multi-reproduction.

A method of enhancing color fidelity in multi-reproduction according to one embodiment of the invention is shown in FIG. 1. In step 10, an original image is provided. The original image may be an electronic original or an electronic version of a hardcopy image. It may be a color image, or a black and white image. Color information and registration information is extracted from the original image in step 12. If the original image is black and white, the "color information" may be gray scale information. Extracted color information and registration information is encoded in a watermark in step 14 and associated with the original image. A hard copy of the original image with a digital watermark containing the encoded color information is produced in step 16. It should be noted that the digital watermark may be invisible or visible, depending on the type of image or the user's requirements. The hard copy may be a color copy or a black and white copy, a printed copy or a photocopy.

Watermarking is an important technology for "hiding" information in images. The general scheme for embedding information in a watermark includes the steps of generating the information to be embedded, encoding (and optionally compressing) the information to be embedded, using a watermarking algorithm to embed the encoded information in the original image, and printing the original image with the watermark. The digital watermark can be implemented using existing (or future) watermarking technologies. Many watermarking algorithms have been proposed for digital images, some of them are robust enough to survive the printing/scanning process. A few of them were designed for printed images (see for example, U.S. Pat. Nos. 5,743,752, 5,790,703, and 5,946,103, the disclosures of which are incorporated herein by reference).

Referring again to FIG. 1, if a copy of the hard copy of the original image with digital watermark is needed, that hard copy is scanned in step 18. In step 20 the digital watermark is retrieved and decoded. If the retrieved embedded color information has been compressed, it is decompressed in step 21. Then the scanned image is aligned with the original image, using the registration information (carried implicitly or explicitly by the watermark) in step 22. The scanned image is then smoothed and sub-sampled in step 23 (in the same manner as at the encoding part in step 14. The type of smoothing and sub-sampling can be included in the information contained in the digital watermark. The sampling positions at the encoding part also match those at the decoding part. A color lookup table is then built by comparing the color samples at the corresponding location in step 24. In the color extraction method used for this embodiment, only those samples classified as "smooth" ones are used in building the lookup table. The color table is seldom fully filled, as one scanned image typically does not contain all the possible colors. The unknown values in the color table are obtained by interpolation and extrapolation. Once the color correction table is completed, color correction is performed using the color correction table in step 26 and a printed copy is generated in step 28.

Figure 2:
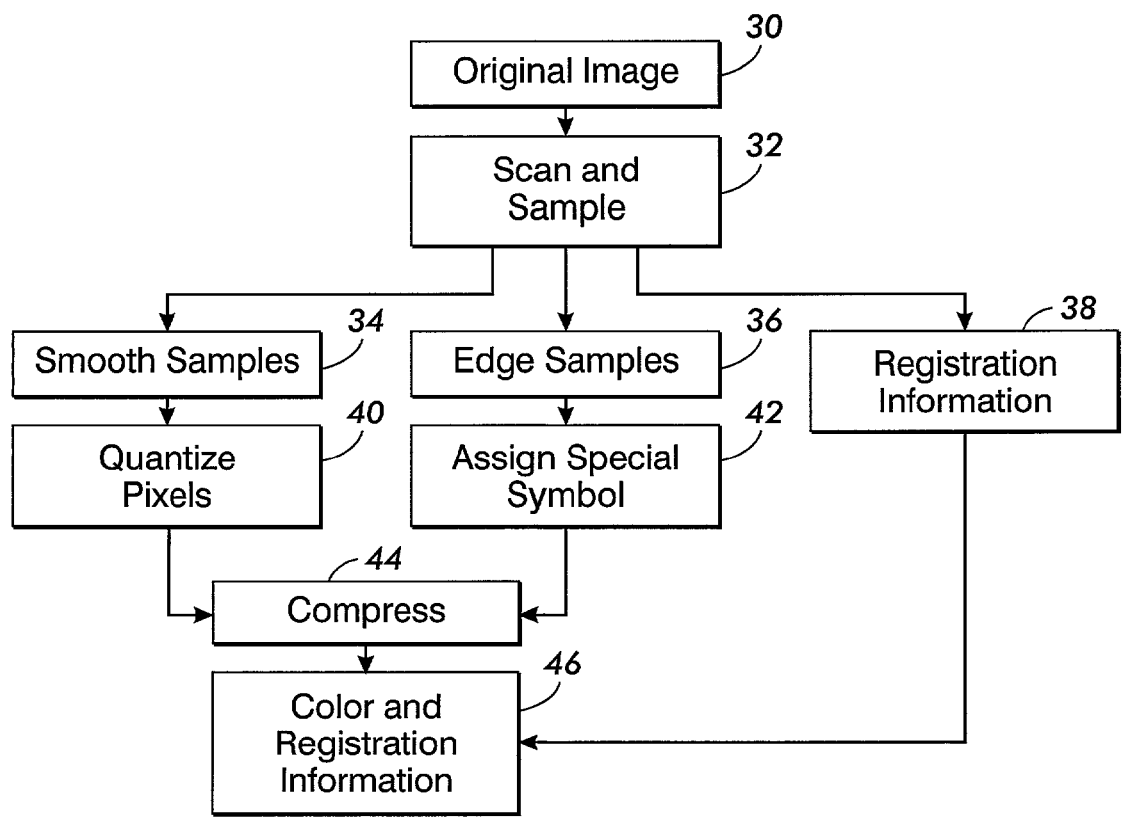
FIG. 2 is a block diagram of a method for extracting color information.

Various methods of extracting color information may be used. One exemplary method of color extraction is shown in FIG. 2. An original image is provided in step 30, which is sub-sampled in step 32. The samples are classified into two categories, those at the relatively smooth region ("smooth samples") in step 34 and those close to edges ("edge samples") in step 36. The edge samples are represented with a special symbol in step 42 while the pixel values of the smooth samples are quantized in step 40. These values are compressed in step 44 for inclusion in the color information (step 46). The registration information may also be embedded in step 38 if the digital watermark does not implicitly provide registration. A simple compression scheme could be DPCM (differential pulse code modulation) followed by entropy coding (similar to treatment of DC components in JPEG coding). Other compression techniques may be used. The compressed color information and registration information (step 46) is then ready to be encoded with a digital watermarking algorithm.

Using the foregoing method, the colors of smooth regions of a sub-sampled image are identified, compressed and encoded using digital watermarks. On reproduction, the watermarks are decoded, uncompressed and compared with the colors of the smooth regions of the scanned image to form a correction table. Interpolation and extrapolation may be used to fill in any unrepresented regions of the table.

Figure 3:
FIG. 3 is an exemplary print which was printed from an original.
Figure 4:
FIG. 4 is an exemplary print which was printed from the scanned image of FIG. 3 using traditional methods.
Figure 5:
FIG. 5 is an exemplary print which was printed from the scanned image containing a digital watermark with color information using the method of the invention.

FIGS. 3–5 illustrate the effect of using the method of the invention. FIG. 3 was printed from an original image. FIG. 4 was printed from the scanned image using traditional methods. Loss of saturation and a shift in background color can be observed. FIG. 5 was printed from the scanned image using the method of the invention and significantly improved overall color fidelity.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for enhancing color fidelity in multi-reproduction, comprising:
   scanning an image to be reproduced, wherein the image contains a digital watermark including color information;
   decoding the color information contained in the watermark;
   comparing the decoded color information with the scanned image;
   generating a correction table from the differences between the decoded color information and the scanned image; and
   performing color correction on the scanned image using the correction table.

2. The method of claim 1, further comprising completing the correction table using interpolation and extrapolation.

3. The method of claim 1, wherein the color information comprises color information from sub-sampled smooth regions of the original image.

4. The method of claim 1, wherein the color information contained in the watermark is compressed prior to encoding into the watermark and further comprising decompressing the compressed color information.

5. The method of claim 1, wherein the digital watermark further includes edge information, registration information and information describing the color extraction technique.

6. The method of claim 1, wherein the scanned image comprises a black and white image.

* * * * *